US008600936B2

(12) United States Patent
Menefee

(10) Patent No.: US 8,600,936 B2
(45) Date of Patent: Dec. 3, 2013

(54) EXPORT LICENSE COMPLIANCE SYSTEM ("ELCS") USING CONTROLLED COMMUNICATIONS

(76) Inventor: Mark D. Menefee, Chevy Chase, MD (US)

( * ) Notice: Subject to any disclaimer, the term of this patent is extended or adjusted under 35 U.S.C. 154(b) by 343 days.

(21) Appl. No.: 11/322,274

(22) Filed: Jan. 3, 2006

(65) Prior Publication Data

US 2007/0162499 A1 Jul. 12, 2007

Related U.S. Application Data

(60) Provisional application No. 60/640,222, filed on Jan. 3, 2005.

(51) Int. Cl.
*G06F 7/00* (2006.01)

(52) U.S. Cl.
USPC ............ 707/628; 707/613; 707/634; 707/696

(58) Field of Classification Search
None
See application file for complete search history.

(56) References Cited

U.S. PATENT DOCUMENTS

| | | | |
|---|---|---|---|
| 6,314,565 B1 * | 11/2001 | Kenner et al. ................. 717/171 |
| 6,598,027 B1 * | 7/2003 | Breen et al. ..................... 705/26 |
| 6,735,701 B1 * | 5/2004 | Jacobson .......................... 726/1 |
| 6,839,678 B1 * | 1/2005 | Schmidt et al. .................. 705/3 |
| 6,920,567 B1 * | 7/2005 | Doherty et al. ................ 726/22 |
| 6,961,633 B1 * | 11/2005 | Marbach et al. ............... 700/97 |
| 7,177,825 B1 * | 2/2007 | Borders et al. ................ 705/26 |
| 7,225,165 B1 * | 5/2007 | Kyojima et al. ............... 705/59 |
| 2001/0032094 A1 * | 10/2001 | Ghosh et al. ..................... 705/1 |
| 2002/0077915 A1 * | 6/2002 | Goto et al. ...................... 705/22 |
| 2003/0061058 A1 * | 3/2003 | Dutta et al. ....................... 705/1 |
| 2003/0065949 A1 * | 4/2003 | Le et al. ......................... 713/201 |
| 2003/0069831 A1 * | 4/2003 | Le et al. .......................... 705/37 |
| 2003/0097319 A1 * | 5/2003 | Moldovan et al. ............. 705/35 |
| 2003/0120557 A1 * | 6/2003 | Evans et al. .................... 705/26 |
| 2003/0171962 A1 * | 9/2003 | Hirth et al. ........................ 705/7 |
| 2003/0225788 A1 * | 12/2003 | Kawakami et al. ........ 707/104.1 |
| 2004/0073507 A1 * | 4/2004 | Scott et al. ..................... 705/37 |
| 2004/0073570 A1 * | 4/2004 | Janakiraman et al. ..... 707/104.1 |
| 2004/0078434 A1 * | 4/2004 | Parker et al. .................. 709/206 |
| 2004/0093340 A1 * | 5/2004 | Edmondson et al. ......... 707/101 |
| 2004/0117337 A1 * | 6/2004 | Beck et al. ........................ 707/1 |
| 2004/0243516 A1 * | 12/2004 | Zinssmeister et al. .......... 705/59 |
| 2005/0010532 A1 * | 1/2005 | Garibay et al. ................. 705/59 |
| 2005/0071280 A1 * | 3/2005 | Irwin et al. ..................... 705/59 |
| 2005/0149453 A1 * | 7/2005 | Amling et al. .................. 705/60 |
| 2005/0256863 A1 * | 11/2005 | Crivella et al. ................... 707/4 |
| 2006/0004591 A1 * | 1/2006 | Johnson et al. .................. 705/1 |
| 2006/0053213 A1 * | 3/2006 | Seeman ........................ 709/218 |
| 2006/0200523 A1 * | 9/2006 | Tokuda et al. ................ 709/206 |
| 2007/0016772 A1 * | 1/2007 | Refior et al. .................. 713/165 |

OTHER PUBLICATIONS

Nunn-Wolfowitz Task Force Report: Industry "Best Practices" Regarding Export Compliance Programs, Jul. 25, 2000.
JPMorgan Chase Vastera, www.jpmorganchase.com, May 21, 2006.
TradeBeam, www.tradebeam.com, Dec. 8, 2004.

* cited by examiner

*Primary Examiner* — Mohammad S Rostami
(74) *Attorney, Agent, or Firm* — Dickstein Shapiro LLP

(57) ABSTRACT

An internet based method and system for communicating terms and conditions of an issued export license to all parties (e.g., exporter, distributor, consignee) in a transaction. The system directs prescribed export related messages from the exporter to the parties. The messages include instructions to the recipients to take certain actions required by the export license terms, and directs those parties to report the results back to the exporter.

18 Claims, 3 Drawing Sheets

EXPORT LICENSE COMPLIANCE SYSTEM ("ELCS") USING CONTROLLED COMMUNICATIONS

CROSS-REFERENCE TO RELATED APPLICATIONS

This application claims the benefit of U.S. Provisional Application No. 60/640,222, filed Jan. 3, 2005.

FIELD OF THE INVENTION

The present invention relates to an export license compliance system and method

BACKGROUND OF THE INVENTION

The United States controls the export and reexport of sensitive military and dual-use equipment and technology (dual-use items have applications in both the military and civilian sectors) using complex regulatory and licensing regimes. Many other industrialized countries do likewise. For example, the U.S. controls the export and reexport of munitions items under the International Trafficking in Arms Regulations (ITAR) and the export and reexport of dual-use items under the Export Administration Regulations. Both regulatory schemes permit exports and reexports only in accordance with tightly defined licenses or license exceptions. Such licenses and license exceptions impose legal duties on all parties involved in the transaction and often draw careful lines between permissible and prohibited conduct with respect to particular foreign destinations for exported items, as well as with respect to specific parties who may receive the items and the uses to which parties may put the items.

Effective compliance with these regulations requires the U.S. exporter and, in some instances, the foreign recipients of U.S.-origin goods and technology, to communicate very specific information to one another in a manner that is accurate, timely, and confidential. These parties also need to be alerted when one party fails to provide required information to the others. The U.S. exporter normally would be the holder of the export license; under both sets of regulations, the exporter/license holder bears primary responsibility for insuring compliance by the other parties to the transaction. Violation of either set of regulations can result in the imposition of civil and criminal fines, imprisonment of individuals, and denial of future export privileges—or all of the above. Actions by foreign parties who receive, reexport, sell, or use U.S.-origin goods and technology can result in similar penalties being imposed against them as well as, in certain circumstances, against the U.S. exporter.

Currently U.S. exporters and foreign recipients of U.S.-origin items must communicate with each other about their compliance with U.S. export controls on an ad hoc basis by a variety of means, including email, facsimile, and hard copy letters. Such communications present the following problems for the management of export control compliance: they are not organized according to a shared set of logical principles; they do not always accurately and completely answer each others' questions; they are not submitted in a timely manner; and they are not stored in a common, centralized system of records for future retrieval and auditing. Consequently, these communications may result in one or more parties to the transaction committing violations of the Export Administration Regulations ("EAR") (15 CFR Chapter VII, Subchapter C) or the International Traffic in Arms Regulations ("ITAR") (22 CFR Parts 120 through 130). The Export License Compliance System that is the subject of this patent application is designed to solve these problems.

Moreover, there is no U.S. regulatory requirement that exporters must adopt a means of complying with the export control laws. Indeed, an exporter can legally refrain from using any management techniques; if lucky, the exporter will not commit a violation of the regulations. Most companies, however, use *some sort of management control to ensure compliance. Yet the compliance schemes vary widely, due to differences in the technologies exported and the geographic markets served. Probably the most widely recognized and influential study of export compliance is the "Nunn-Wolfowitz Task Force Report: Industry "Best Practices" Regarding Export Compliance Programs," which was published Jul. 25, 2000 ("Nunn-Wolfowitz Report"). This "blue ribbon" task force was commissioned by the Board of Directors of Hughes Electronics Corporation to make recommendations concerning any changes in Hughes' operations and procedures that may be necessary or desirable to ensure that the corporation has in place a "best practices" standard for complying with the letter and spirit of U.S. export control law and regulations. A copy of the Nunn-Wolfowitz Report is attached. This Report also can be found at: www.kslaw.com/library/pdf7nuriiiwolfowitz.pdf).

A review of the Nunn-Wolfowitz Report shows that this comprehensive and thoughtful analysis, which was prepared by a prestigious group of experts, issues than the subject matter of the Export License Compliance System as set forth herein. They offer services designed to help exporters screen potential customers to detect parties whose export privileges have been denied or restricted by the U.S. Government; classify items to be exported to determine whether they fall within technical parameters that indicate an export license would be required; and prepare documents required to effect shipments and to submit reports to the U.S. Government for statistical and regulatory purposes. But none of these companies offer the particular service of ensuring compliance with the terms and conditions of export licenses that could be obtained using the subject of this patent application.

For example, the company Vastera, Inc., which is probably the largest and best known company in the marketplace for export compliance managed services, states on its website Cwww.vastera.com), that it offers the following services in the area of export compliance: classification, screening, document preparation, drafting procedures and instructions, government reporting requirements, compliance training, and audit and internal reviews. In the category of "document preparation", Vastera emphasizes the preparation of the bills of lading, and other shipping documents. In the category of "government reporting requirements", Vastera emphasizes the preparation of the Shippers Export Declaration or its equivalent document in the Automated Export System, both of which are required by law to be submitted to the U.S. Government in connection with exports. However, unlike the present invention, Vastera does not offer a particular electronic service that is designed specifically for managing compliance with particular export licenses.

Another managed services company in the marketplace is Open Harbor, Inc., which states on its website Cwww.openharbor.com), that it offers services such as: restricted party screening, embargo screening, C-TPAT participant screening, security questionnaire, shipment security audit, workflow management, product compliance screening, license determination, product catalog, classification tools, landed costs, and global trade documents. However, unlike the present invention, Open Harbor does not offer a particular electronic service that is designed specifically for managing compliance with particular export licenses.

Companies such as Vastera and Open Harbor provide general purpose services designed to assist companies in complying with the EAR and ITAR with respect to a broad range of export transactions. The scope of compliance services offered by these companies includes export transactions that do not require a license under the EAR or ITAR, as well as transactions that do require export licenses under those regulatory systems. These compliance services also are intended to be used at all stages of business transactions, ranging from screening initial inquiries received from potential purchases, through pro form a quotations of prices, to completion of shipping documentation. However, unlike the present invention, these companies do not provide discrete electronic systems designed to manage compliance with the terms and conditions of specific export licenses that have been issued by the Government prior to export.

SUMMARY AND OBJECTS OF THE INVENTION

The above-noted deficiencies are overcome by the present invention. The present invention, hereinafter referred to as the Export License Compliance System (ELCS) is an internet-based system that: (1) precisely communicates the terms and conditions of an issued export license to all parties to the transaction; directs prescribed messages from the U.S. exporter to appropriate parties instructing them to take certain actions required by the license, and directs them to report the results of their actions back to the U.S. exporter and other designated parties.

The ELCS also reports to the U.S. exporter in the event that another party has missed a deadline or failed to perform a required action and captures all documentation required by the license, as well as the records of who performed what actions and when they performed those actions.

The documentation and recordation features of the ELCS provide the data for the U.S. exporter and any other parties designated by the exporter to conduct instant compliance status checks for particular licenses as well as scheduled routine audits for a defined set of licenses. These data are organized according to systematic principles; depending on how these principles are defined and on the legal jurisdiction involved, these data are authenticated and admitted into evidence in courts if necessary.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

Figure 1:
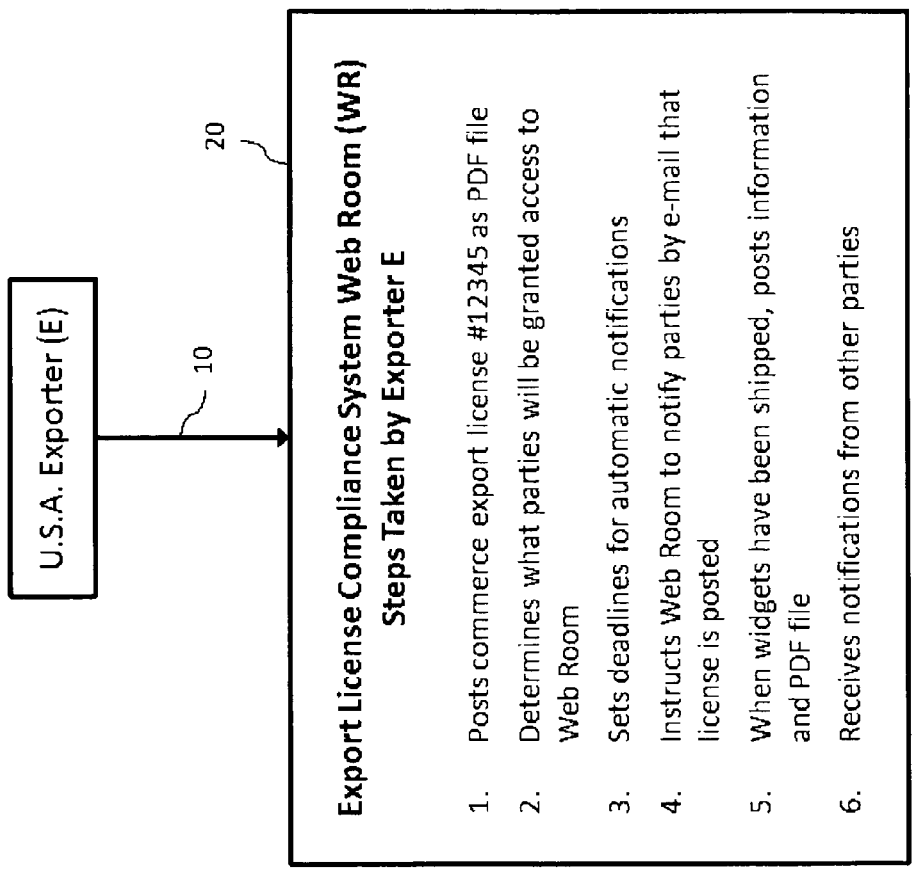
FIG. 1 is a flow chart illustrating the export license compliance system website created by the Exporter.

The ELCS can operate as a stand-alone computer-based system or it can be used in conjunction with local or wide area computer networks, such as, for example, a company's intranet communications system. The ELCS also can be used in connection with other general purpose export compliance systems such as those employed by Vastera and Open Harbor, which are discussed above.

However, if the ELCS is used in the context of a corporate wide area network or "intranet", or in conjunction with products provided by managed export compliance services firms such as Vastera and Open Harbor, nonetheless the ELCS will retain its essential features. Those features include, but are not limited to: (1) use of a common Web Room; (2) directed communications, using timers and reminders, which are controlled by the Web Room Administrator according to the requirements specified by the U.S. Exporter; (3) restricted access to the Web Room; and (4) recordkeeping functions to preserve the communications posted to the Web Room along with their dates, times, and authors.

That the ELCS is compatible with other export compliance systems does not render the ELCS generic. It only means that the ELCS is a discrete, well-defined system for tightly controlled communications. It does not replace such other systems of communication.

Moreover, the ELCS is not the same as a mere set of e-mail communications that are concerned with a common topic, such as a "chat room". The difference is that the ELCS contains strict rules governing the admission of the parties to the system of communication, what can be communicated, and when it must be communicated. A simple set of email communications about a common topic, such as a "chat room," is significantly different from the ELCS because, among other reasons, discussions in chat rooms can and often do deviate from the main topic, omit key data, and any party who knows the web address can join in on the discussion or commentary.
Computer Hardware and Software Required The ELCS is designed to operate on standard, off-the-shelf computer equipment and platform and communications as other infrastructural software in order to facilitate usage of the system internationally. As such, it would include the following equipment and software to function efficiently.

Hardware.

All parties to the ELCS would require personal computers or other logic devices, such as PDA's, including but not limited to devices operating on at least Intel Pentium 5 or equivalent microprocessors such as the G3 Mac OS X-compatible microprocessors, or their functional equivalents. All computers would have to have modems or other network connections sufficient as is commonly known or used to maintain reliable access to the Internet, such as 14.4 Kbps or greater. The computers would have to have sufficient memory, such as 450 Mb or greater, to store and retrieve PDF files using common software such as Adobe Acrobat version 4 or the equivalent.

Software.

All parties would require software operating systems including but not limited to Windows NT, Mac OS X version 10 or the equivalent. All parties would require word processing software such as Microsoft Word or the equivalent. The parties also would require software sufficient to support email communications with a variety of other users of the Internet.

Web Room Administrator.

The Web Room Administrator would require hardware and software sufficient to operate the Web Room effectively. Specifically, the Administrator would require routers and modems capable of accepting and sending PDF files and email to a variety of parties and supporting simultaneous access to the Web Room for numerous parties. The Administrator would require sufficient memory storage capability to store and readily retrieve moderate amounts of data in the form of email and PDF files, and to manage a regular backup storage function for the data posted to the Web Room for permanent data storage. The Administrator would require software enabling it to organize communications in chronological order with associated links to the identities of the parties and the PDF files posted to the Web Room by the parties. The Administrator also would require the capability to handle commercial, internationally available encryption for all communications to and from the Web Room.

In one embodiment, the Export License Compliance System (ELCS) would work as follows. Flow chart illustrations of how the ELCS process would work are attached at FIGS. 1-3.

Figure 2:
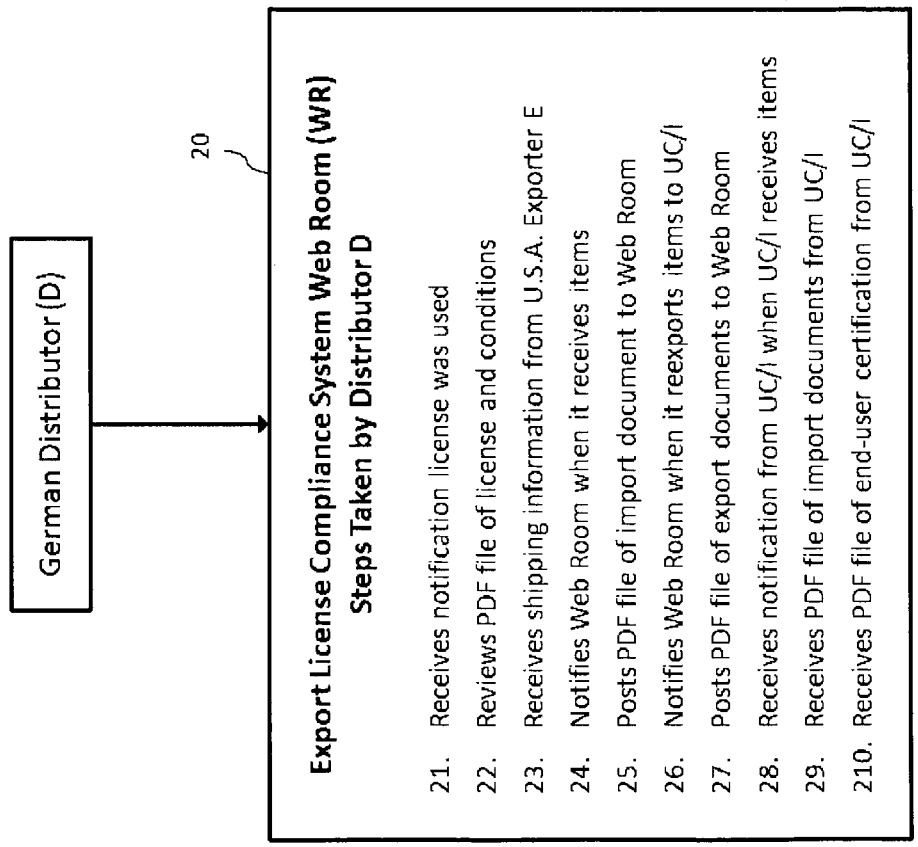
FIG. 2 is a flow chart of the website of FIG. 1 as used by the Distributor.

U.S. Exporter (E) applies for and is granted an export license to export Widgets to its exclusive distributor (D) located in another country, such as Germany (FIG. 2). D is also referred to as an Intermediate Consignee under the export control regulations. The export license authorizes Distributor D to sell and reexport the Widgets to D's customers, also known as Ultimate Consignees (UC's), located in other countries, such as Italy, Poland, and Turkey (referred to as UC/I, UC/P, and UC/T, respectively). In this example of the embodiment the license is valid for 2 years and allows exports of, up to $10 million of Widgets. The Widgets are classified in terms of technical performance parameters established by the U.S. Government, so that only Widgets performing within certain limitations may be exported under the license.

In the ELCS, the export license can contain numerous specific conditions, or provisos, which create legal responsibilities for some or all of the parties to the licensed transaction. In this example, the license contains the following conditions:

The items authorized for export are not to be used in any of the sensitive nuclear activities described in Part 744.2 of the Export Administration Regulations.

Applicant/exporter must inform consignee of all license conditions.

No resale, transfer, or reexport of the items listed on this license is authorized without prior authorization by the U.S. Government.

The applicant and consignee must keep records of all transactions under this license, including the name and address of each customer, and date. (See Part 782 of the EAR for additional information.)

The applicant must obtain from the ultimate consignee/end-user a written communication, acknowledging and accepting all license terms and conditions, and confirming that the items will not be used to develop Weapons of Mass Destruction or their means of delivery. This document should be available to U.S. Government officials upon request.

In FIG. 1, Exporter E creates, directly through connection 10 or through a service provider, a website 20 on the Internet (hereinafter referred to as the "Web Room" or WR). At 2, E imposes restrictions on access to this Web Room, using encryption of data and authorized password access, so that only a person who receives an encryption key and password from E may have access to the information posted on the Web Room 20. E authorizes Distributor D to have access to all information posted on the Web Room. E authorizes Ultimate Consignees UC/I, UC/P, and UC/T to have limited access to information posted on the Web Room 20. All UC's have access to certain information, such as the validity period for the export license and the specific license conditions that all parties must follow. However, other information is restricted in order to protect business confidential information; for example, UC/I is allowed to see only the information concerning the particular Widgets that are to be shipped to UC/I, but UC/I is denied access to information concerning the Widgets that are to be shipped to UC/P and UC/T. This restriction is necessary in order to insure that exporter E and distributor D can preserve the confidentiality of their sales, marketing, and distribution program.

At 4, the Web Room notifies each party via email whenever any new information pertaining to them is posted on the Web Room. The Web Room 20 also provides a Bulletin Board feature which any party to the transaction can use to ask and answer particular questions about the transactions, or about issues concerning compliance with the regulations and the terms of sale and distribution.

The Web Room also contains an entry log which records every communication or posting made to the Web Room by any party (6). The entry log records the date and time each communication or posting was made, and who made it.

The Web Room 20 notifies Exporter E through communication channel 10 who has complete administrative access rights to all data submitted to the Web Room by any party, by means of an email message whenever any party has submitted data to the Web Room (6). The Web Room is programmed by E to record deadlines for activities to be completed by any party. The Web Room is also programmed to notify E and/or any designated party by email in the event that someone has failed to meet a deadline (3).

Exporter E posts to its Web Room at least the following information:

(a) License Number (1); (b) Validity Period of license; (c) Dollar value of exports authorized, decremented per shipment; (d) Number and description of Widgets; (e) Export Commodity Control Number; (f) Harmonized Tariff System Number; (g) Shipping information (date of shipment from the U.S.; Forwarder and Carrier; route of shipment; estimated arrival at Distributor; bill of lading number; etc.) (5); (h) License terms and specific license conditions; and (i) E also posts to the Web Room a complete file (using any format for the file, e.g., PDF, RTF, etc.) of the license and its conditions.

FIG. 2 shows what information the Web Room 20 provides to Distributor D as well as what information D submits 24 to the Web Room 20. In this example, D posts to the Web Room 20 at least the following information:

(a) Date of receipt of shipment of Widgets (28, 23); (b) Confirmation of quantity and condition of Widgets; (c) Confirmation of understanding and compliance 22 with any applicable license terms and conditions; (d) date of reexport 26 of Widgets to Ultimate Consignee (e.g., UC/I); and (e) D also posts to the Web Room a file containing the complete set of import 25, 29 and export documents 27 showing movement of the Widgets into and out of Germany as well as end user certification 210.

Figure 3:
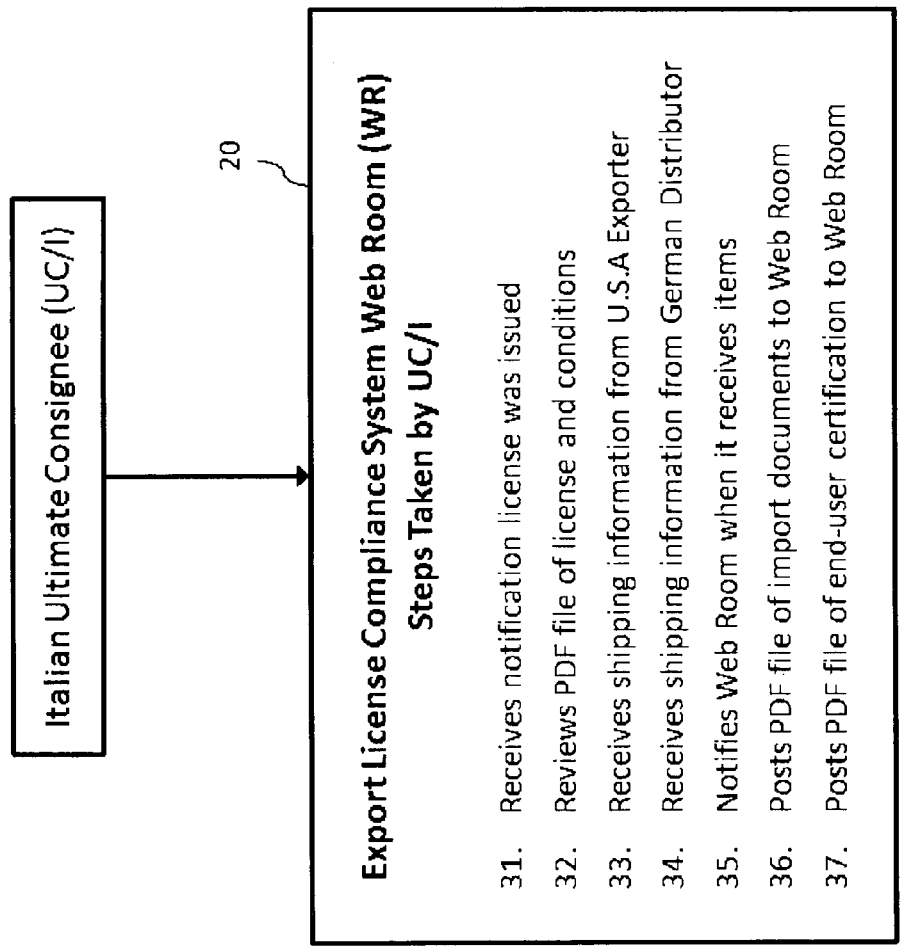
FIG. 3 is a flow chart of the website of FIG. 1 as implemented by the Ultimate Consignee (US/I).

FIG. 3 shows what information the web room 20 provides to Ultimate Consignee I as well as what information UC/I submits to the Web Room. In this example, UC/I posts to the Web Room 20 at least the following information:

(a) Date of receipt of shipment of Widgets from distributor D; (b) Confirmation of quantity and condition of Widgets; (c) Confirmation of understanding and compliance with any applicable license terms and conditions (31); (d) Copy of End-Use Certification (37) (if required by a license condition) which is signed (this can be a file showing an image of a signed document, a text version of the document, or a certificate bearing an electronic signature as authorized by the regulations); (e) If required, UC/I can post other information (36) to the Web Room 20 to confirm that the end-user and end-use are legitimate, such as: for example, photographs of the equipment after it has been installed; and reports by engineers or technicians following servicing the equipment; and (f) UC/I also posts to the Web Room a file containing the complete set of import documents for Italy (36), as well as the required acceptance of the license's terms (31, 32) and conditions and the statement that the Widgets will not be used to develop Weapons of Mass Destruction or their means of delivery.

Exporter E installs automatic alerts in the Web Room 20 that will generate an email notice to it at a specified time in the event that the other parties fail to post required information on the Web Room (FIG. 1, element 3). For example, exporter E specifies that the Web Room 20 provide it with an alert if distributor D does not post a notification confirming D's receipt of the Widgets within 3 days of their export from the U.S. This example enables exporter E to contact the forwarder or carrier to track the shipment and determine what was the cause for the delay in delivery to distributor D. As another example, exporter E specifies that the Web Room 20 provide it and distributor D with alerts if UC/I failed to post a required End-Use Certificate on the Web Room within 5 days of UC/I's receipt of the Widgets.

If exporter E uses an automated system to produce export, import, and shipping documents, the ELCS will accept designated data elements from these documents automatically in order to help provide a seamless electronic shipping and export regulation compliance system.

Exporter E uses the information posted on the Web Room as data to be examined during routine audits undertaken to insure that E is conducting its business in compliance with corporate policy and all applicable export control regulations. In some instances, exporter E will provide access to the Web Room to investigative or licensing officials of the U.S. Government who are conducting investigations or audits concerning the underlying business transactions.

Management and Regulatory Results Produced by the ELCS

Use of the ELCS achieves the following results: Exporter E controls the export and reexport process with precision to insure compliance with the regulations by all parties. All parties to the transaction receive and acknowledge receipt of the terms and specific conditions of the export license. All parties know when the Widgets are shipped, when they are expected to arrive at their destination, and where the Widgets are located in the distribution network. The parties also receive automatic alerts concerning shipping delays. This has the ancillary affect of reducing delays and risks of loss of the goods due to shipping errors or transportation failures, as well as due to theft of the items that might occur during transit or temporary storage at warehouses and docks. All parties have access to a common record-keeping system that is maintained according to the level of competence established by the exporter. Internal compliance audits are facilitated. Investigations and audits by the U.S. Government are facilitated.

Other Embodiments

ELCS can be used as a general reminder system. For example, Exporter E, distributor D, and the three UC's are involved in the export and reexport of Gizmos, which require an export license to certain countries but may be exported under a license exception to certain other countries. They use the ELCS to insure that all parties know when they must obtain a license for a particular product and destination, and when they do not.

As another example, U.S. company E hires a foreign national from the People's Republic of China (FN/PRC) to work on the development of a high technology item in the U.S. Under the export regulations, the transfer of certain technical information in the U.S. to FN/PRC which requires an export license. U.S. company E uses the ELCS to manage compliance with the terms and conditions of its export license concerning the employment activities of FN/PRC. For example, E is required to restrict the access of FN/PRC to specifically delimited research projects, and is required to restrict FN/PRC's access to certain buildings and laboratories by means of coded badges. In this example, the ELCS is used by substituting projects or buildings for the UC's, and by substituting a corporate compliance officer for the distributor D.

Additional levels of resellers are created in the ELCS. For example, in the original scenario involving exporter E, distributor D, and ultimate consignees UC/I, UC/P, and UC/f, each UC have, in turn, numerous customers within its respective country. Thus, UC/I posts to the Web Room 20 required information about its local purchasers, and those Italian purchasers post information about their situations, such as their address, longitude and latitude, date they began using the equipment, and their End-Use Certificates.

Additional parties are granted access to the Web Room 20 for specific purposes. For example, third party providers of services for the maintenance, repair, upgrade, or replacement of parts are granted access in order to (a) be made aware of restrictions imposed by the license; and (b) provide reports to the UC, D, and E concerning the current status and use of the equipment.

Having described specific preferred embodiments of the invention with reference to the accompanying drawing, it is to be understood that the invention is not limited to those precise embodiments, and that various changes and modifications may be effected therein by one skilled in the art without departing from the scope or the spirit of the invention as defined in the appended claims.

What is claimed as new and desired to be protected by Letters Patent of the United States is:

1. A computerized system for export license compliance, comprising:
   a computer for receiving and for sending export related information;
   a website configured
      to receive, store, and post license information from at least one exporter that is licensed to export an item, the license information including at least information on the validity period of the license,
      to receive, store, and post distributor information from at least one distributor that receives the item from the exporter and is authorized by the license to sell the item, the distributor information including at least a date of re-export of the item, and
      to receive, store, and post consignee information from at least one consignee that is a customer of the at least one distributor, the consignee information including at least a date of receipt of a shipment from the distributor;
   a notifier that provides to the website a first specified time period for receiving the distributor information and a second specified time period for receiving the consignee information, wherein
      the website is configured to automatically transmit notifications to at least one of the exporter and the distributor in the event the distributor fails to post the date of re-export of the item to the website before the first specified time period elapses, and
      the website is configured to automatically transmit notifications to at least one of the exporter and the consignee in the event the consignee fails to post the date of receipt of the shipment from the distributor before the second specified time period elapses; and a log contained on the website for providing to the exporter the times and dates that consignee information and distributor information was posted to the website by the at least one consignee and the at least one distributor.

2. The computerized system of claim 1, wherein access to the website is restricted to authorized users having user types, the user types including exporter, distributor, and consignee user types, and wherein exporter, distributor, and consignee user types each have specifically tailored access.

3. The computerized system of claim 1, the website further comprising an information exchange apparatus where the at least one exporter, distributor, and consignee may use the website to request export related information from another of the at least one exporter, distributor, and consignee, and the other exporter, distributor, or consignee may use the website to respond to the export related information request.

4. The computerized system of claim 1, further comprising an automatic alert system configured to instruct a microprocessor acting in conjunction with logic device memory to inform the exporters, distributors, and consignees of pertinent posted and un-posted export related information by e-mail through a network connection.

5. The computerized system of claim 1 wherein the license information further comprises at least one of: a number and description of an export item, an export commodity control number, a harmonized tariff system number, shipping information, license terms and conditions, and a complete copy of an export license and its conditions.

6. The computerized system of claim 1, wherein the distributor information further includes at least one of: a date of receipt of shipment, a confirmation of quantity and condition, a confirmation of understanding and compliance with applicable license terms and conditions, a complete copy of import and export documents, and an end user certification.

7. The computerized system of claim 1, wherein the consignee information further includes at least one of: a confirmation of quantity and condition of a product, a confirmation of understanding and compliance with applicable license terms and conditions, a copy of a signed end-use certification, information to verify end-user and end-use legitimacy, a complete copy of import documents, an acceptance of the license terms and conditions, and a statement that the product will not be used to develop Weapons of Mass Destruction or their means of delivery.

8. A non-transitory computer readable storage medium containing a program configured to generate an export license compliance system, the program comprising:
- a module for instructing a microprocessor acting in conjunction with logic device memory to generate a website through a network connection, wherein the website is configured to
  - receive, store, and post license information from at least one exporter that is licensed to export an item to a country, the license information including at least information on the validity period of the license,
  - receive store, and post distributor information from at least one distributor that receives the item from the exporter and is authorized by the license to sell the item, the distributor license information including at least a date of re-export of the item, and
  - to receive, store, and post consignee information from at least one consignee that is a customer of the at least one distributor, the consignee information including at least a date of receipt of a shipment from the distributor;
- a website configuring module for providing a first deadline for receiving the date of re-export of the item and a second deadline for receiving the date of receipt of the shipment from the distributor and for automatically notifying the distributor of the first deadline and automatically notifying the consignee of the second deadline, through the network connection;
- a website notifying module programmed to automatically notify the at least one exporter, distributor, and consignee of posted distributor information and consignee information relevant to their respective export role, to automatically notify at least one of the exporter and the distributor if the distributor fails to post the date of re-export of the item by the first deadline, and to automatically notify at least one of the exporter and the consignee if the consignee fails to post the date of receipt of the shipment by the second deadline; and
- a logging module for logging dates and times of website-information posted through the network connection.

9. The non-transitory computer readable storage medium of claim 8, wherein access to the website is restricted to authorized users having user types, the user types including exporter, distributor, and consignee user types, and wherein exporter, distributor, and consignee user types each have specifically tailored access.

10. The non-transitory computer readable storage medium of claim 8, the program further comprising a website information exchange module where the at least one exporter, distributor, and consignee may use the website to request export related information from another of said at least one exporter, distributor, and consignee, and the other exporter, distributor, or consignee may use the website to respond to the export related information request.

11. The non-transitory computer readable storage medium of claim 8, the program further comprising a module for providing an automatic alert system that instructs a microprocessor acting in conjunction with logic device memory to inform the exporters, distributors, and consignees of pertinent posted and un-posted export related information by e-mail through a network connection.

12. The non-transitory computer readable storage medium of claim 8, wherein the license information further comprises at least one of: a number and description of an export item, an export commodity control number, a harmonized tariff system number, shipping information, license terms and conditions, and a complete copy of an export license and its conditions.

13. The non-transitory computer readable storage medium of claim 8, wherein the distributor information further comprises at least one of: a date of receipt of shipment, a confirmation of quantity and condition, a confirmation of understanding and compliance with applicable license terms and conditions, a complete copy of import and export documents, and an end user certification.

14. The non-transitory computer readable storage medium of claim 8, wherein the consignee information further comprises at least one of: a confirmation of quantity and condition of a product, a confirmation of understanding and compliance with applicable license terms and conditions, a copy of a signed end-use certification, information to verify end-user and end-use legitimacy, a complete copy of import documents, an acceptance of the license terms and conditions, and a statement that the product will not be used to develop Weapons of Mass Destruction or their means of delivery.

15. The computerized system of claim 1, wherein the distributor information further includes a confirmation of understanding and compliance with applicable license terms and conditions, and wherein the website is configured to automatically transmit notifications to the exporter in the event the distributor fails to post the confirmation by a specified third deadline.

16. The computerized system of claim 1, wherein the consignee information further includes a confirmation of understanding and compliance with applicable license terms and conditions, and wherein the website is configured automatically transmit notifications to the exporter in the event the consignee fails to post the confirmation by a specified third deadline.

17. The non-transitory computer readable storage medium of claim 8, wherein the distributor information further comprises a confirmation of understanding and compliance with applicable license terms and conditions, and wherein the website notifying module is configured to automatically notify the exporter if the distributor fails to post the confirmation by a specified third deadline.

18. The non-transitory computer readable storage medium of claim 8, wherein the consignee information further comprises a confirmation of understanding and compliance with applicable license terms and conditions, and wherein the website notifying module is configured to automatically notify the exporter if the consignee fails to post the confirmation by a specified third deadline.

* * * * *